(12) United States Patent
Durham

(10) Patent No.: US 7,770,899 B1
(45) Date of Patent: Aug. 10, 2010

(54) PRESSURE ACTUATED SEAL CARRIER

(75) Inventor: Kevin Durham, Houston, TX (US)

(73) Assignee: Aker Subsea Inc., Houston, TX (US)

( * ) Notice: Subject to any disclaimer, the term of this patent is extended or adjusted under 35 U.S.C. 154(b) by 59 days.

(21) Appl. No.: 10/872,834

(22) Filed: Jun. 21, 2004

(51) Int. Cl.
*F16L 17/06* (2006.01)

(52) U.S. Cl. ...................................... 277/603; 277/609

(58) Field of Classification Search ............. 5/328–330, 5/337–339, 603, 609
See application file for complete search history.

(56) References Cited

U.S. PATENT DOCUMENTS

| | | | | | |
|---|---|---|---|---|---|
| 3,820,830 | A | * | 6/1974 | Dryer | 285/336 |
| 3,915,462 | A | * | 10/1975 | Bruns et al. | 277/647 |
| 4,470,609 | A | * | 9/1984 | Poe | 285/334.2 |
| 4,531,711 | A | * | 7/1985 | Bunch et al. | 251/214 |
| 4,537,406 | A | * | 8/1985 | Hirasuna et al. | 277/314 |
| 4,553,759 | A | * | 11/1985 | Kilmoyer | 251/214 |
| 4,787,642 | A | * | 11/1988 | Etheridge | 277/550 |
| 5,044,672 | A | * | 9/1991 | Skeels et al. | 285/98 |
| 5,094,297 | A | * | 3/1992 | Bridges | 166/382 |
| 5,224,715 | A | * | 7/1993 | Downes et al. | 277/322 |
| 5,246,236 | A | * | 9/1993 | Szarka et al. | 277/337 |
| 5,551,703 | A | * | 9/1996 | Morvant | 277/584 |
| 5,564,715 | A | * | 10/1996 | Wallace | 277/612 |
| 5,938,246 | A | * | 8/1999 | Wallace et al. | 285/351 |
| 5,997,003 | A | * | 12/1999 | Turner | 277/339 |
| 6,227,547 | B1 | * | 5/2001 | Dietle et al. | 277/336 |
| 6,561,521 | B2 | * | 5/2003 | Janoff et al. | 277/603 |
| 6,869,079 | B2 | * | 3/2005 | Zheng | 277/511 |

\* cited by examiner

*Primary Examiner*—Thomas B Will
*Assistant Examiner*—Gilbert Y Lee
(74) *Attorney, Agent, or Firm*—Zarian Midgley & Johnson PLLC

(57) ABSTRACT

A pressure actuated seal carrier assembly includes a seal carrier with a body with an inner and an outer projection that are integral with the body and opposite to one another. An inner groove with a first seal is formed in the inner projection, and an outer groove with a second seal is formed in the outer projection. As pressure enters the cavity, the projections are forced radically outward and inward, which maintains contact with the mating surfaces, thus excluding any no extrusion gaps between the seal carrier and the walls of the pressurized space. A spacer is located in the cavity to maintain space between the grooves and bear the axial load.

14 Claims, 3 Drawing Sheets

PRESSURE ACTUATED SEAL CARRIER

FIELD

The present embodiments relate to a pressure actuated seal carrier that creates a resilient seal with no extrusion gap at all pressures and temperatures. Particularly, the present embodiments relate to a pressure actuated seal carrier for use as a subsea tubing hanger elastomer seal pack off.

BACKGROUND

Tubing hangers, tree caps, casing hangers, and other pressure controlling and remotely delivered tubular assemblies used in the oil and gas industry have sealing assemblies used to direct the flow of produced fluids as well as injected and hydraulic control fluids. These seal assemblies cannot be fully supported on each end as radial clearances between the supporting hardware and the seal bores must be present to allow assembly or remote delivery of the interfacing parts.

Plastic rings, known as extrusion resistors, are typically assembled with a tight or interference fit to minimize the clearances between the hardware and prevent flow of non-metallic seal elements into small gaps between the hardware and seal bores. As pressure and temperatures increase, the gaps created due to thermal and mechanical deflections increase and the stiffness and strength of the plastic material decrease.

When pressure is applied to typical seal carriers, the seals are crushed into a groove and the metal of the typical seal carrier does not follow the deflections induced by pressure, thereby allowing the seal out of the grove.

A need exists for a device to replace known extrusion resistors with a pressure actuated seal carrier that allows no gap between the hardware and seal bores at all pressures and temperatures. The pressure actuated seal carrier deflects under pressure a greater amount than the surrounding seal bores insuring contact between the metal carrier and seal bores as pressure increases.

A need exists for non metallic sealing elements to be used in high temperature and high pressure sealing applications.

A need exists for a seal carrier assembly operable for effecting a seal between a pair of spaced surfaces with no extrusion gap at all pressures and temperatures.

The embodied devices herein were designed to satisfy these needs.

SUMMARY

A pressure actuated seal carrier assembly is a one-piece seal carrier with a body that includes an inner and an outer projection. The projections are integral with the body on opposite sides to one another. A cavity is formed between the projections and the body. An inner groove is formed in the inner projection and an outer groove is formed in the outer projection. Each of the grooves includes a seal. A spacer in the cavity maintains space between the inner groove and the outer groove as bears the axial load.

BRIEF DESCRIPTION OF THE DRAWINGS

The detailed description will be better understood in conjunction with the accompanying drawings, wherein like reference characters represent like elements, as follows.

Figure 1:
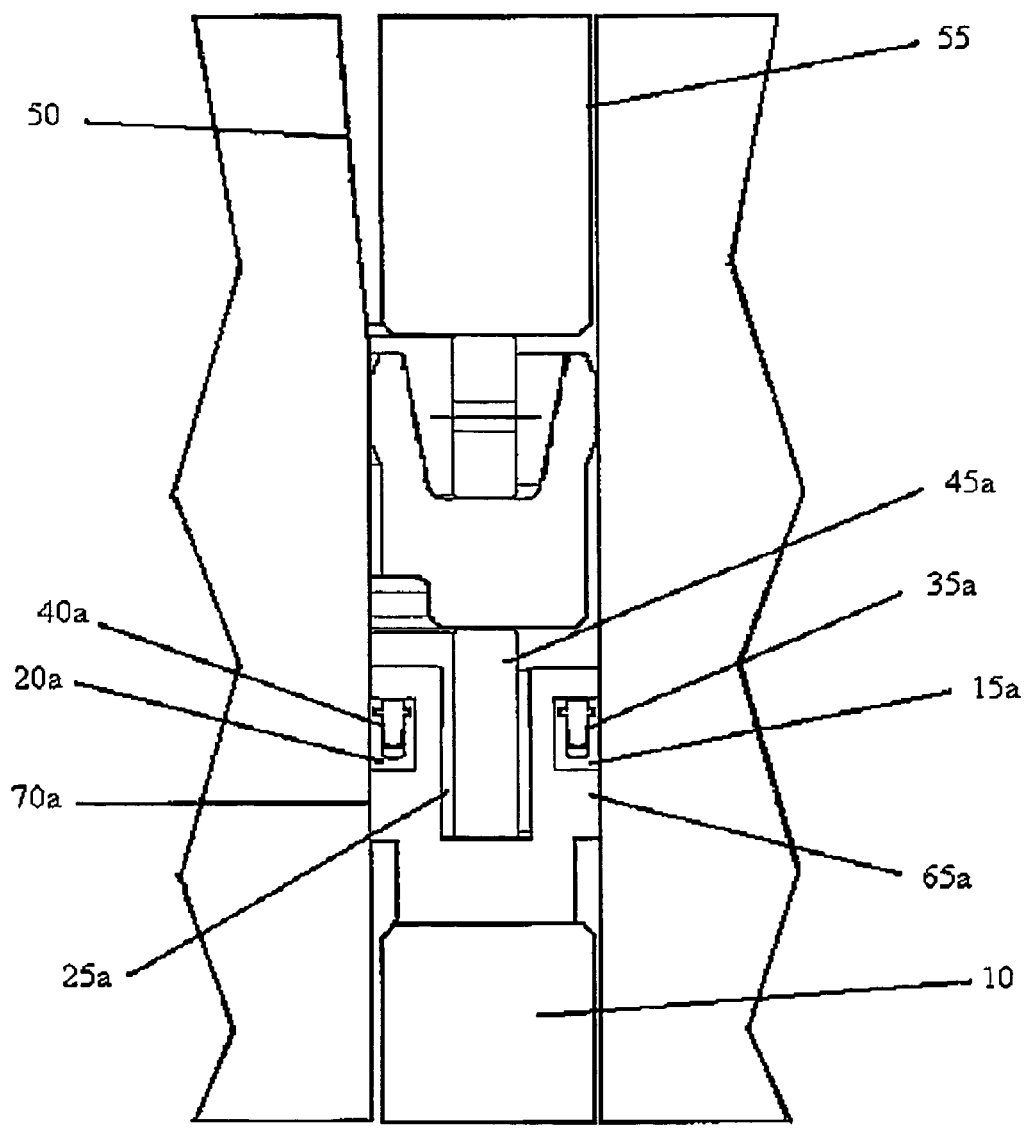
FIG. 1 depicts a cross sectional view of the tubing hanger with an embodiment of the pressure actuated seal carrier with two seals engaged in a subsea tree spool.

The present apparatus is detailed below with reference to the listed figures.

DETAILED DESCRIPTION OF THE PREFERRED EMBODIMENTS

Before explaining the present apparatus in detail, it is to be understood that the apparatus is not limited to the particular embodiments and that it can be practiced or carried out in various ways.

The embodied assemblies relate to a pressure actuated seal carrier that creates a resilient seal with no extrusion gap at all pressures and temperatures. Particularly, the present embodiments relate to a pressure actuated seal carrier for use in subsea wellhead equipment. The embodied assemblies are used to isolate and direct produced, injected and control fluids at elevated temperatures and pressures. The embodied assemblies ensure that a metal to metal seal gland exists at all pressures and temperatures such that the non metallic seal elements are not allowed to "extrude" through small gaps left between the surrounding hardware and sealing surfaces.

The embodied assemblies replace the known extrusion resistors with a pressure actuated seal carrier that does not allows a gap between the hardware and seal bores at all pressures and temperatures. The pressure actuated seal carrier deflects under pressure a greater amount than the surrounding seal bores ensure contact between the metal carrier and seal bores as pressure increases.

The embodied seal carrier assemblies are typically used in environments in which a metal to metal gland seal is required at a wide range of temperatures and pressures. Examples of pressure sources that the embodied seal carrier assemblies are normally subjected to include pressurized control fluid, pressurized injected fluid, or pressurized produced fluid.

The embodied metal seal carrier assemblies are a housing for seals, preferably non-metallic seals. The assembly creates a metal to metal gland at all pressures and temperatures. An embodiment of the assembly includes a carrier, typically a metal ring, having U-shaped ends or V-shaped ends to allow expansion and contraction of the seal carrier as the corresponding seal bores deflect under the action of applied pressure and temperature. If the carrier is dual sided, the carriers can have an H-shape. Even though U-shaped ends or V-shaped ends are preferred, the seal carrier can have any two pronged shape that allows expansion and contraction of the seal carrier and, yet provide space to allow the carrier to communicate with the pressure source. Dual sided embodiment can have the two-prong shape on either end, but the same shape is not required for both ends.

The embodied metal seal carrier assemblies include grooves, typically square grooves, on the outer and inner diameters to house the seal elements. The seal elements are preferably non-metallic seal, such as elastomatic O-rings, plastic seal, spring energized lip seals, T-seal, high strength stainless steel, V-packing, and combinations thereof. The seal elements can be a metal seal or can include springs.

Springs are used to ensure a better seal at low pressure and temperatures. The preferred embodiment of the seal carrier assembly utilizes Teflon V seals with a metal spring for resiliency at low temperatures and pressures.

The embodied metal seal carrier assemblies include spacer rings located in the cavity of the carrier. The spacer rings transmit axial loads arising from pressure sources. Typically, the spacer is a solid cylinder, but common shapes are usable as long as the spacer does not block the carrier from the pressure source. The spacer can be slidable or removable.

The design of the carrier ensures that a non-metallic seal is not squeezed out of the groove when activated by pressure. The embodied metal seal carrier assemblies are effective at high pressures and temperatures as well as low pressures and temperatures. Regardless of the applied pressure or temperature, the embodied metal seal carrier assemblies create a metal to metal gland for a resilient seal with no extrusion gaps. The seal carrier assembly is reusable.

Figure 2:
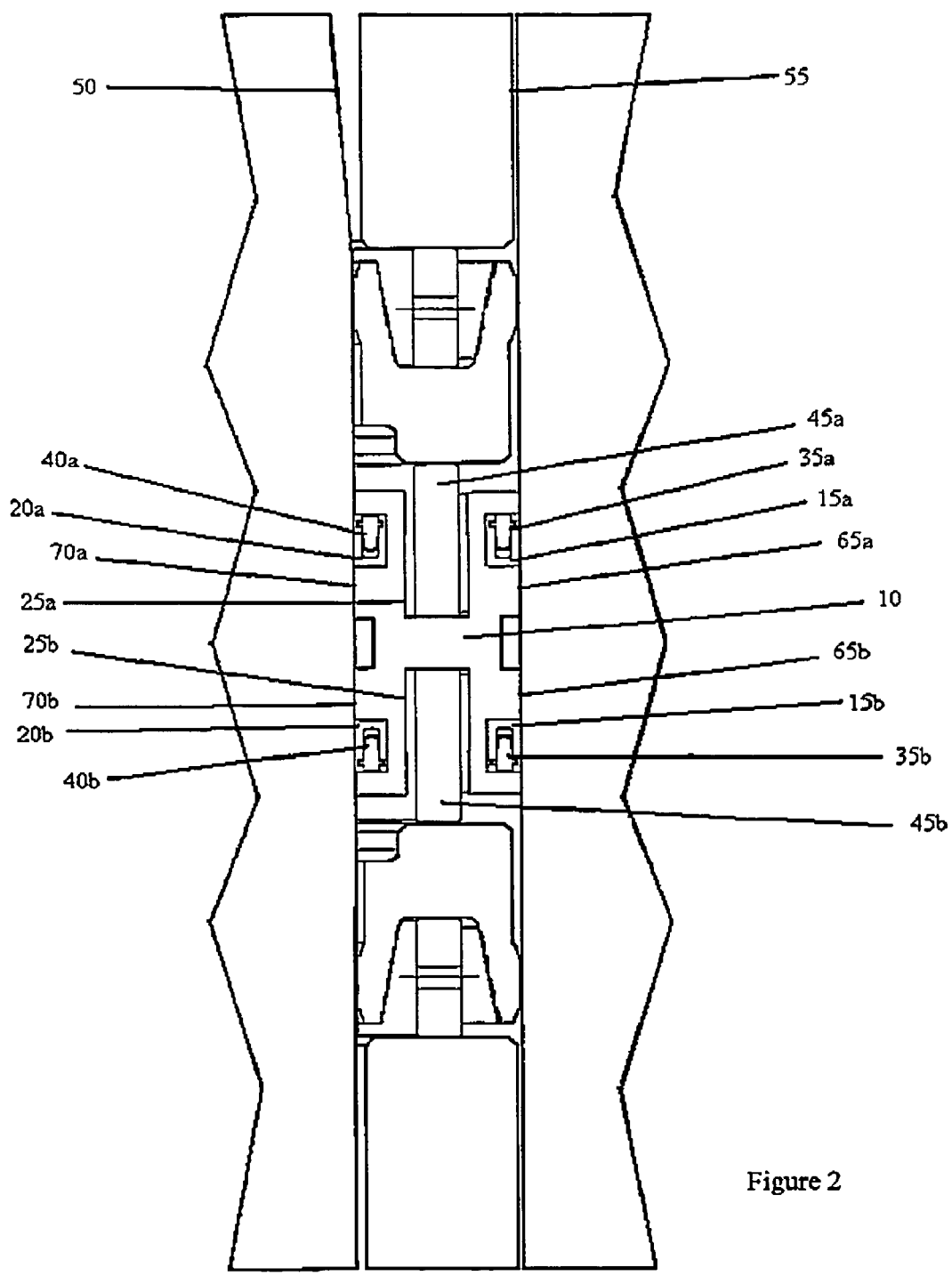
FIG. 2 depicts a cross sectional view of the tubing hanger with an embodiment of the pressure actuated seal carrier with four seals engaged in a subsea tree spool.
Figure 3:
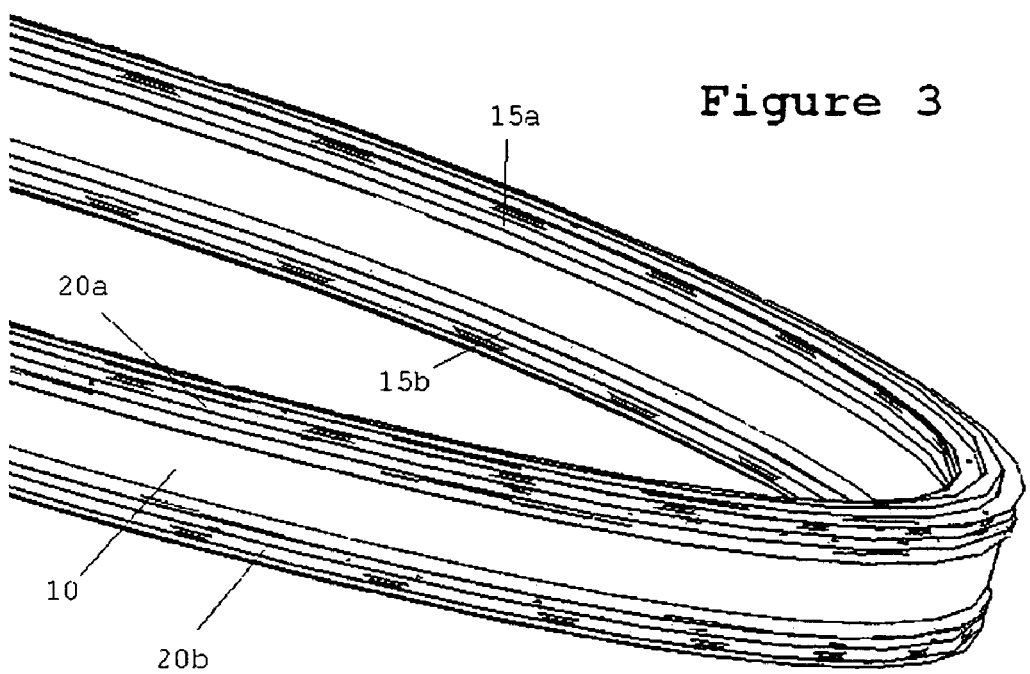
FIG. 3 depicts an isometric view of the pressure actuated seal carrier.

With reference to the figures, FIG. 1 depicts a cross sectional view of the tubing hanger with an embodiment of the pressure actuated seal carrier with two seals engaged in a subsea tree spool. A pressure actuated seal carrier assembly includes a seal carrier with a body (10) with two or more projections. FIG. 1 depicts an embodiment the seal carrier with two projections (65a and 70a), while FIG. 2 and FIG. 3 depict the embodiment of the seal carrier with four projections (65a, 65b, 70a, and 70b). The projections extend from the body and are located on opposite sides of one another as depicted in FIG. 1, FIG. 2, and FIG. 3.

In FIG. 1, the seal carrier includes an inner groove (15a) disposed in the inner projection (65a), and an outer groove (20a) is disposed in the outer projection (70a). In the dual sided seal carrier in FIG. 2 and FIG. 3, inner grooves (15a and 15b) are located in both inner projections (65a and 65b), and outer groves (20a and 20b) are located in the outer projections (70a and 70b).

Typically, the seal carrier (10) is composed of metal. Examples of usable metals for the seal carrier (10) include titanium, titanium alloys, nickel-based steel, stainless steel, and combinations thereof. The metal needs to be able to withstand the high pressure and temperatures of the environment in which the pressure actuated seal carrier assembly is used.

The projections and the body form a cavity (25a). Dual-sided embodiments, as depicted in FIG. 2, have two cavities (25a and 25b). Typically, pressure enters the cavities and forces the inner and outer projections outward forming a seal with no extrusion gap between the seal carrier and a seal bore, for example, at all pressures and temperatures.

FIG. 1 depicts that the inner groove (15a) can be configured for a clearance fit and the outer groove (20a) can be configured for an interference fit. The combinations of the interference fit and the clearance fit ensures initial contact of projections (65a and 70a) with seal grooves when the pressure actuated seal carrier assembly is installed. As an alternative, the inner groove (15a) can be configured with an interference fit.

Continuing with FIG. 1, a first seal (35a) is located in the inner groove (15a) and a second seal (40a) is located in the outer groove (20a). For the dual sided embodiment, a seal (35a, 35b, 40a, and 40b) is located in each respective groove (15a, 15b, 20a, and 20b).

The embodied seal carrier assemblies include a spacer (45a) disposed in the cavity (25a). The spacer (45a) is adapted to bear axial loads that arise due to a pressure end load to be transmitted through exterior spacers and into the tubing hanger body. The spacer (45a) is adapted to maintain space between the inner groove (15a) and the outer groove (20a), The spacer (45a) is typically composed of a metal, such as titanium, titanium alloys, nickel-based steel, stainless steel, and combinations thereof. Other materials are usable as long as the material can withstand the high pressure and temperatures of the environment in which the spacer (45a) is used. The spacer (45a) and the carrier (10) can be made of the same or different materials.

The embodied dual seal carrier assemblies include two spacers (45a and 45b) located in the respective cavities (25a and 25b). The spacers to bear axial load from a separate pressure sources and maintain space between respective inner grooves and outer grooves within the cavities.

The preferable use of the pressure actuated seal carrier assembly is for a tubing hanger placed in a spool. FIG. 1 and FIG. 2 depict the pressure actuated seal carrier assemblies installed between the spool (50) and the tubing hanger (55). The projections (65a and 65b) on the inner grooves (15a and 15b) create a metal to metal gland seal with the tubing hanger (55). The projections (70a and 70b) on the outer grooves (20a and 20b) create a metal to metal gland seal with the spool (50).

When used for a tubing hanger placed in a spool, the embodied seal carrier assembly is placed onto the tubing hanger. The tubing hanger is installed into a spool that has a taper. The taper is typically angle between 4 degrees and 15 degrees off the axis of the tubing hanger. The seal carrier assembly engages the taper so that the outer seal contacts the spool.

The tubing hanger is loaded into the spool by using a running tool, which utilizes a weight set procedure, or a hydraulic procedure, or by combinations thereof. As the tubing hanger is loaded, the seal carrier assembly deflects under the downward force on the tubing hanger into the annulus between the tubing and the spool. The seal carrier contracts radically to contact the parallel seal bores between the tubing hanger and spool. A designed radial interference between the seal bores and the pressure actuated carrier generates a contact force upon delivery that increases with applied pressure. Deflecting the seal carrier assembly forms a metal to metal gland between the seal carrier assembly and the spool and tubing hanger. To prevent galling during installation, a silver coating can be applied that to provide lubricity as the seal carrier slides down the taper.

The seals are then energized by applying pressure. Examples of pressure include introducing the pressurized control fluid, pressurized injected fluid, or pressurized produced fluid to the seal carrier assembly.

While this method and apparatus have been described with emphasis on the preferred embodiments, it should be understood that within the scope of the appended claims, the method and apparatus might be practiced other than as specifically described herein.

What is claimed is:

1. A pressure actuated resilient seal carrier assembly comprising:
   a. a one-piece seal carrier composed of a metal, the seal carrier comprising a body with an inner projection and an outer projection on a first side, wherein the projections are integral with the body and positioned on opposite sides of the first side of the body to one another, wherein a cavity is formed between the projections and the body, the cavity having a first sidewall, a second sidewall and a bottom surface, wherein an inner groove is formed in the inner projection, and wherein an outer groove is formed in the outer projection;
   b. a flexible non-metallic first seal positioned in the inner groove;
   c. a flexible non-metallic second seal positioned in the outer groove; and
   d. a metal spacer disposed in the cavity, which does not substantially fill the cavity wherein the spacer maintains spaces between the inner groove and the outer groove and bears axial loads due to a pressure end load transmitted through the spacer while being capable of maintaining an axial separation with adjacent components, thereby forming a resilient seal carrier assembly providing no extrusion gaps with the non-metallic seals when activated by pressure, wherein the seals further comprise a spring, wherein a cavity space is formed between the spacer and the first sidewall of the cavity so that the spacer does not contact the first sidewall;

e. said body having a second side opposite the first side, the second side having a second cavity formed therein.

2. The seal carrier assembly of claim 1, wherein the seal carrier assembly is reusable.

3. The seal carrier assembly of claim 1, wherein the seal carrier assembly further comprises
   a. a second inner projection and a second outer projection integral with the body and positioned on opposite sides of the second side of the body to one another and opposite to the inner and outer projections, wherein the second cavity is formed between the second projections and the body, wherein second inner groove is formed in the second inner projection, and wherein a second outer groove is formed in the second outer projection;
   b. a third seal positioned in the second inner groove;
   c. a fourth seal positioned in the second outer groove; and
   d. a second spacer disposed in the second cavity, wherein the second spacer is adapted to maintain space between the second inner groove and the second outer groove and bear axial loads forming a resilient seal carrier assembly providing no extrusion gaps and a non-metallic seal when activated by pressure.

4. The seal carrier assembly of claim 1, wherein the metal is selected from the group consisting of titanium, titanium alloys, nickel-based steel, stainless steel, and combinations thereof.

5. The seal carrier assembly of claim 1, wherein the inner groove is configured for a clearance fit with the first seal.

6. The seal carrier assembly of claim 1, wherein the outer groove is configured for an interference fit.

7. The seal carrier assembly of claim 1, wherein the cavity comprises a U-shape or a V-shape.

8. The seal carrier assembly of claim 1, wherein the seals are composed of a non-metallic material, wherein the non-metallic material is selected from the group consisting of elastomeric O-rings, plastic seal, spring energized lip seals, T-seal, V-packing, and combinations thereof.

9. The seal carrier assembly of claim 1, wherein the spacer and the carrier are different materials.

10. The seal carrier assembly of claim 1, wherein the metal seal comprises a metal selected from the group consisting of titanium, titanium alloys, nickel-based steel, stainless steel, and combinations thereof.

11. A fluid pressure actuated resilient seal carrier assembly comprising:
    a. a one-piece seal carrier comprising a body with an inner projection and an outer projection on a first side, wherein the projections are integral with the body and positioned on opposite sides of the first side of the body to one another, wherein a cavity is formed between the projections and the body, the cavity having a first sidewall, a second sidewall and a bottom surface, wherein an inner groove is formed in the inner projection, and wherein an outer groove is formed in the outer projection;
    b. a flexible non-metallic first seal positioned in the inner groove;
    c. a flexible non-metallic second seal positioned in the outer groove; and
    d. a spacer disposed in the cavity, which does not substantially fill the cavity wherein the spacer maintains spaces between the inner groove and the outer groove and bears axial loads due to a pressure end load transmitted through the spacer while being capable of maintaining an axial separation with adjacent components, thereby forming a resilient seal carrier assembly providing no extrusion gaps with the non-metallic seals when activated by fluid pressure, wherein the seals further comprise a spring, wherein a cavity space is formed between the spacer and the first sidewall of the cavity so that the spacer does not contact the first sidewall;
    e. said body having a second side opposite the first side, the second side having a second cavity formed therein.

12. A pressure actuated resilient seal carrier assembly comprising:
    a. a one-piece seal carrier comprising a body with an inner projection and an outer projection on a first side, wherein the projections are integral with the body and positioned on opposite sides of the first side of the body to one another, wherein a cavity is formed between the projections and the body, the cavity having a first sidewall, a second sidewall and a bottom surface, wherein an inner groove is formed in the inner projection, and wherein an outer groove is formed in the outer projection;
    b. a flexible non-metallic first seal positioned in the inner groove;
    c. a flexible non-metallic second seal positioned in the outer groove; and
    d. a spacer disposed in the cavity, wherein the spacer maintains spaces between the inner groove and the outer groove and bears axial loads due to a pressure end load transmitted through the spacer while being capable of maintaining an axial separation with adjacent components, thereby forming a pressure actuated resilient seal carrier assembly providing no extrusion gaps with the non-metallic seals and the spacer does not completely fill the cavity when activated by pressure, wherein the seals further comprise a spring, wherein a cavity space is formed between the spacer and the first sidewall of the cavity so that the spacer does not contact the first sidewall;
    e. said body having a second side opposite the first side, the second side having a second cavity formed therein.

13. The seal carrier assembly of claim 12, wherein the seal carrier assembly further comprises
    a. a second inner projection and a second outer projection integral with the body and positioned on opposite sides of the second side of the body to one another and opposite to the inner and outer projections, wherein the second cavity is formed between the second projections and the body, wherein second inner groove is formed in the second inner projection, and wherein a second outer groove is formed in the second outer projection;
    b. a third seal positioned in the second inner groove;
    c. a fourth seal positioned in the second outer groove; and
    d. a second spacer disposed in the second cavity, wherein the second spacer is adapted to maintain space between the second inner groove and the second outer groove and bear axial loads forming a resilient seal carrier assembly providing no extrusion gaps and a non-metallic seal when activated by pressure.

14. The seal carrier assembly of claim 12, wherein the seal carrier is metal.

* * * * *